US006668992B2

(12) United States Patent
Shimizu et al.

(10) Patent No.: US 6,668,992 B2
(45) Date of Patent: Dec. 30, 2003

(54) CLUTCH-BRAKE SYSTEM AND PRESS MACHINE

(75) Inventors: Noriyuki Shimizu, Sagamihara (JP); Masakatsu Shiga, Machida (JP); Naonori Taniguchi, Sagamihara (JP)

(73) Assignee: Aida Engineering, Ltd., Sagamihara (JP)

( * ) Notice: Subject to any disclaimer, the term of this patent is extended or adjusted under 35 U.S.C. 154(b) by 0 days.

(21) Appl. No.: 10/124,414

(22) Filed: Apr. 18, 2002

(65) Prior Publication Data
US 2002/0157913 A1 Oct. 31, 2002

(30) Foreign Application Priority Data
Apr. 27, 2001 (JP) ........................................ 2001-131809

(51) Int. Cl.[7] ............................................... F16D 67/04
(52) U.S. Cl. .................. 192/18 A; 192/85 AA
(58) Field of Search ............................. 192/18 R, 18 A, 192/12 C, 85 AA

(56) References Cited
U.S. PATENT DOCUMENTS 3,224,538 A * 12/1965 Ward ...................... 192/85 AB
4,138,005 A 2/1979 Schneider et al.
5,499,705 A 3/1996 Ide
5,564,333 A * 10/1996 Palmer ....................... 100/282

FOREIGN PATENT DOCUMENTS

JP  04-279297  10/1992
JP  11-005199   1/1999

* cited by examiner

*Primary Examiner*—Richard M. Lorence
(74) *Attorney, Agent, or Firm*—Oblon, Spivak, McClelland, Maier & Neustadt, P.C.

(57) ABSTRACT

A clutch-brake system in which at least one of clutch and brake devices has the following structure. A friction plate is mounted on a drive shaft to be synchronously rotatable on the drive shaft, but not to be movable in an axis direction of the drive shaft. First and second discs are provided on the opposite sides of the friction plate in the axis direction of the drive shaft, and movable in the axis direction. The first and second discs are synchronously moved in the opposite directions along the axis of the drive shaft, enabling to selectively switch between an operation state and a non-operation state.

11 Claims, 2 Drawing Sheets

CLUTCH-BRAKE SYSTEM AND PRESS MACHINE

Japanese Patent Application No. 2001-131809, filed on Apr. 27, 2001, is hereby incorporated by reference in its entirety.

BACKGROUND OF THE INVENTION

The present invention relates to a clutch-brake system and a press machine using the same.

For example, a press machine 1P shown in FIG. 2 is formed by a frame 10P on which a drive shaft 20P and flywheel 25P are rotatably mounted but not movable in an axis (Z) direction (or longitudinal direction) of the drive shaft 20P. Reference numeral 26P denotes a cover which houses a clutch device integrally fixed to the flywheel 25P.

A clutch device 30P constructed according to the prior art includes a clutch disc 41P, a clutch friction plate 31P, an air intake port 48P and a spring 46P. The clutch device 30P is mounted on the drive shaft 20P at one end (right as viewed in FIG. 2) for driving a slider (not shown).

The clutch disc 41P includes: an inner stationary disc 41IP mounted on the flywheel 25P to be synchronously rotatable and not to be movable in the Z direction, when the flywheel is rotatably supported on the drive shaft 20P through a bearing 14P; and an outer movable disc 41OP mounted on the flywheel 25P to be synchronously rotatable and to be movable in the axial (Z) direction along a guide pin 45P.

The clutch friction plate 31P is mounted on the drive shaft 20P at one end (right end) to be synchronously rotatable with the drive shaft 20P and to be movable through a spline structure 32 or the like in the Z direction. More particularly, the clutch friction plate 31P has a rotatable holding portion 31R mounted on the drive shaft 20P through an anchoring device 15P for synchronized rotation and an anchor portion 31K for screwedly anchoring the clutch friction plate 31P, these portions being movable relative to each other through the spline structure 32 or the like in the Z direction. Structures of hydraulic lubrication and alignment control incorporated into the spline structure 32 or the like are omitted from FIG. 2.

The outer disc 41OP is biased rightward as viewed in FIG. 2 by the spring 46P mounted around a guide pin 45P in the normal (or clutch release) state, in which state the outer disc 41OP is in its clutch release (OFF) state and spaced apart from the clutch friction plate 31P. Reference numeral 43P denotes linings.

When air is supplied from a rotary joint 49P into a cylinder chamber 26SP through the air intake port 48P, a piston 41DOP is moved leftward as viewed in FIG. 2 against the bias of the spring 46P. Thus, the outer movable disc 41OP integrally mounted on the piston 41DOP is moved leftward to urge the clutch friction plate 31P against the inner stationary disc 41IP while moving the same toward the inner disc 41IP. As a result, the clutch device will be switched to the clutch engagement (ON) state.

More particularly, the clutch device 30P can selectively be switched to either of the clutch engagement state that can transmit the rotational energy of the flywheel 25P (26P) to the drive shaft 20P or the clutch release state that cannot transmit the rotational energy to the drive shaft 20P, in response to the air supply or exhaust as in FIG. 2.

A brake device 50P constructed according to the prior art includes a brake disc 61P, a brake friction plate 51P, an air intake port 68P and a spring 66P and is mounted on the drive shaft 20P at the other end (leftward end as viewed in FIG. 2).

The brake disc 61P includes an inner stationary disc 61IP mounted on a frame 10P (or bracket 19P) not to be movable in the Z direction and an outer movable disc 61OP mounted on the frame 10P (or bracket 19P) to be movable in the axis direction along a guide pin 67. Reference numeral 63P denotes linings.

The brake friction plate 51P is mounted on the drive shaft 20P at the other (leftward) end to be synchronously rotatable with the drive shaft 20P and to be movable through the spline structure or the like in the Z direction. More particularly, the brake friction plate 51P includes a rotatable rotation holding portion 51R and an anchoring portion 51K for screwedly securing the brake friction plate 51P, these portions being movable relative to each other through the spline structure 52 or the like in the Z direction.

The alignment in the rotation holding portion 51R of the brake friction plate 51P can be controlled by using the outer peripheries of a control ring member 18 and lid member 19F. An O-ring 53 is provided to seal for lubricant. In other words, the brake device 50P has the lubricating structure (53 and so on) and the alignment control structure (18, 19F and so on) associated with the spline structure 52 or the like.

When the compressed air within the cylinder chamber 61SP is exhausted through the air intake port 68P in the brake release state, the outer movable disc 61OP is moved rightward as viewed in FIG. 2 under the bias of the spring 66P mounted around a guide pin 65P to urge the brake friction plate 51P against the inner stationary disc 61IP while moving the same toward the inner disc 61IP. Thus, the brake device 50P can be switched to its brake engagement (ON) state.

On the contrary, if air is supplied into the cylinder chamber 61SP through the air intake port 68P, a piston 61PP in the interior of the cylinder chamber 61SP is moved leftward as viewed in FIG. 2 against the bias of the spring 66P to push a bolt member 62 fastened on the outer disc 61OP. Thus, the outer disc 61OP is moved leftward to separate it from the brake friction plate 51P. This state is the brake release (OFF) state.

In other words, the brake device 50P can selectively be switched to either of the brake release state that releases the braking force to permit the rotation in the drive shaft 20P or the brake engagement state that can apply the braking force to the rotating drive shaft 20P, in response to the air supply or exhaust as in FIG. 2.

A clutch-brake system is provided by combining the clutch device 30P with the brake device 50P. The clutch-brake system can be switched to the clutch engagement and brake release state in response to the air supply and to the clutch release and brake engagement state in response to the air exhaust.

A press machine including such a clutch-brake system has been required to more improve in speed and accuracy, as in the other industrial machines and so on. In the viewpoint of versatility, differentiation and so on, it is strongly required that the press machine is improved in response on start or stop or both start and stop.

However, the prior art clutch device 30P is designed to provide the braking force by urging the movable clutch disc 41OP against the stationary clutch disc 41IP while moving the clutch friction plate 31P on the drive shaft 20P in the axial direction. Therefore, the clutch device 30P is of complicated, large-sized and weighted structure, leading to increase of the manufacturing cost. The clutch disc 41OP and clutch friction plate 31P will easily be degraded in rapid and smooth movement. Since the clutch device 30P has an increased inertial mass, it is difficult that the clutch device 30P shows quick response. Furthermore, the mechanical backlash and play will reduce the accuracy, provide a source of noise and shorten the mechanical life. This is true of the brake device 50P.

And yet, the clutch and brake devices 30P, 50P have many mechanical setting locations since they are of complicated structure and require mechanical delicate adjustments. Thus, a disagreement may easily be created between the responsibilities of the clutch and brake devices 30P, 50P.

If the starting point of a pressing process is to be strictly managed, the degradation of the clutch action in the clutch device 30P will also degrade the accuracy in product. To improve the accurate work in the press machine, the clutch action must be more improved in speed.

On the other hand, if the brake operation speed of the brake device 50P is low when the pressing process is suspended, the quality of the products would be affected. In order to further improve the yield of the products, the brake operation speed has to be further increased.

If the ability of the clutch device is improved, the braking characteristics (response and speed) of the brake device may be less associated with the clutch device, or vice versa. To product various high-precision parts such as electronic parts with increased accuracy, however, it is increasingly required that any disagreement between the clutch and brake characteristics (response and speed) is eliminated, thereby appropriately combining these characteristics to improve the whole performance in the clutch-brake system.

BRIEF SUMMARY OF THE INVENTION

The present invention may provide a clutch-brake system and a press machine using the same, which can greatly improve the clutch and/or brake characteristics.

According to one aspect of the present invention, there is provided a clutch-brake system comprising: a flywheel; a drive shaft driven by rotational energy transmitted from the flywheel; a clutch device selectively switchable between an operation state in which the rotational energy from the flywheel is transmitted to the drive shaft, and a non-operation state in which no rotational energy is transmitted to the drive shaft; and a brake device selectively switchable between an operation state in which a braking force is applied to the drive shaft during rotation, and a non-operation state in which the braking force is released to permit rotation of the drive shaft, wherein at least one of the clutch and brake devices has: a friction plate mounted on the drive shaft to be synchronously rotatable on the drive shaft, but not to be movable in an axis direction of the drive shaft; and first and second discs provided on the opposite sides of the friction plate in the axis direction of the drive shaft, and movable in the axis direction, and wherein at least one of the clutch and brake devices synchronously moves the first and second discs in the opposite directions along an axis of the drive shaft, enabling to selectively switch between the operation state and the non-operation state.

If this configuration is applied to a clutch device, the clutch device may include: a clutch friction plate mounted on the drive shaft to be synchronously rotatable on the drive shaft, but not to be movable in the axis direction of the drive shaft; and first and second clutch discs provided on the opposite sides of the clutch friction plate in the axis direction of the drive shaft, and movable in the axis direction.

In the clutch device, the first and second clutch discs are normally separated from each other and selectively switched into a clutch release state in which the first and second clutch discs are separated from clutch friction plate, under the bias of a spring, for example. At this time, the clutch friction plate is stationary fixed to the drive shaft.

If the clutch device is actuated to switch to the clutch engagement state, the first and second discs are synchronously moved toward each other along the axis of the drive shaft (that is, the first clutch disc is moved from left to right while the second clutch disc is moved from right to left, for example)m to sandwich the clutch friction plate, under the action of a piston.

Thus, the clutch device can selectively be switched from the clutch release state to the clutch engagement state. At this time, the amount of transfer (or stroke) in each of the first and second clutch discs may require only one-half prior-art stroke, thereby reducing the operation time by half.

Therefore, the clutch operational characteristics (response and speed) can highly be improved. Since the clutch friction plate is fixedly mounted on the drive shaft, any spline structure or the like, which would be required in the prior art, may be eliminated to reduce the inertial mass, thereby effectively improving the quick response.

The clutch friction plate may be fixed to an end surface of the drive shaft. In comparison with the prior art requiring the spline structure, hydraulic lubricating structure and alignment control structure, all for moving the clutch friction plate along the axis, the clutch device of the present invention may greatly be simplified in structure and reduced in cost. Moreover, the mechanical backlash and play between components may be reduced to decrease the noise level. In addition, the mechanical life may be increased. Since the clutch operation can more early be provided, the clutch device may appropriately be synchronized in operation with the brake device (or brake release operation), thereby reducing the disagreement of operation between the clutch and brake devices.

If the aforementioned configuration is applied to the brake device, the later may include: a brake friction plate mounted on the drive shaft to be synchronously rotatable on the drive shaft, but not to be movable in the axis direction of the drive shaft; and first and second brake discs provided on the opposite sides of the brake friction plate in the axis direction of the drive shaft, and movable in the axis direction.

In the brake device, the first and second brake discs are normally moved toward each other along the axis of the drive shaft under the bias of a spring, and can be selectively switched to the brake engagement state wherein they engage the brake friction plate, for example. At this time, the brake friction plate is stationary fixed to the drive shaft.

When the brake device is switched to its brake release state, the first and second brake discs are synchronously moved away from each other or outwardly from the brake friction plate along the axis (e.g., the first brake disc is moved from left to right while the second brake disc is moved from right to left) and placed in no-contact with the brake friction plate, against the bias of the spring, in response to the supply of compressed air, for example.

Thus, the brake device can selectively be switched from the brake engagement state to the brake release state. At this time, the amount of transfer in each of the first and second brake discs may require only one-half prior art stroke, thereby reducing the operation time by half.

Therefore, the brake operational characteristics (response and speed) can highly be improved. Since the brake friction plate is fixedly mounted on the driveshaft, furthermore, any spline structure or the like, which would be required in the prior art, may be eliminated to reduce the inertial mass, thereby effectively improving the quick response.

The brake friction plate may be fixed to the drive shaft, or an end surface of the drive shaft, for example. In comparison with the prior art requiring the spline structure, hydraulic lubricating structure and alignment control structure all for axially moving the brake friction plate, the brake device of the present invention may greatly be simplified in structure and reduced in cost. Moreover, the mechanical backlash and play between components may be reduced to decrease the noise level. In addition, the mechanical life may be increased. Since the brake operation can more early be provided, the brake device may appropriately be synchronized in operation with the clutch device (or clutch release operation), thereby reducing the disagreement of operation between the clutch and brake devices.

The aforementioned configuration may be applied to both the clutch and brake devices.

In this case, the above effects can be implemented in each of the clutch and brake devices, and the inertial mass on the side of the drive shaft can be further decreased, so that the clutch operation characteristics (response and speed) and the brake operation characteristics (response and speed) can be greatly improved.

The clutch friction plate may be fixed to one end surface of the drive shaft, and the brake friction plate may be fixed to the other end surface of the drive shaft. Thus, any spline structure for moving these friction plates along the axis can be perfectly eliminated to simplify the clutch and brake devices in structure and to reduce them in cost. And yet, the mechanical life can highly be increased and the noise may more be reduced. In addition, the clutch operation and brake release, or the clutch release and brake operation may surely and reliably be carried out at the same time.

DETAILED DESCRIPTION OF THE EMBODIMENT

Figure 1:
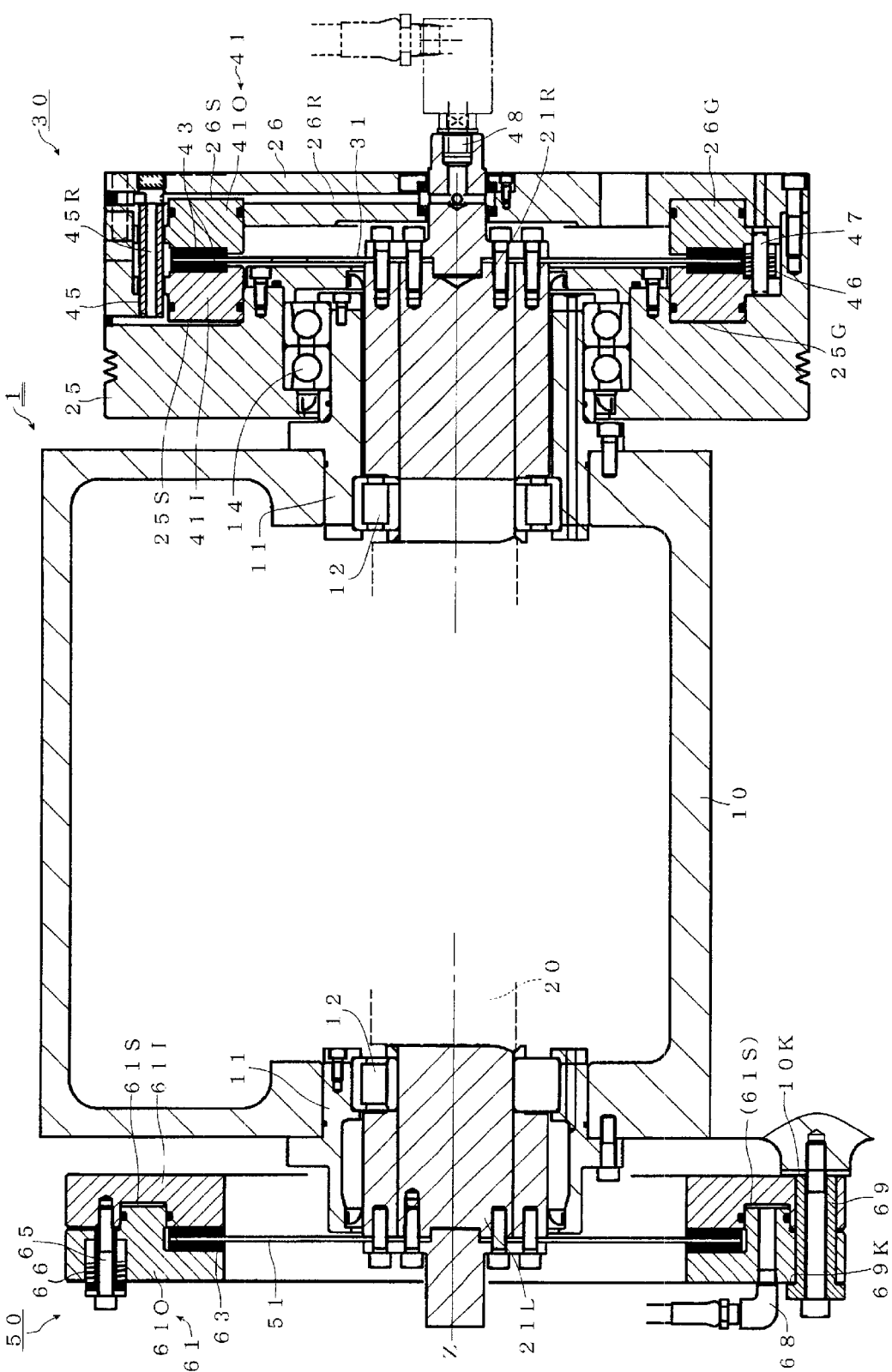
FIG. 1 is a cross-sectional view illustrating one embodiment of the present invention.
Figure 2:
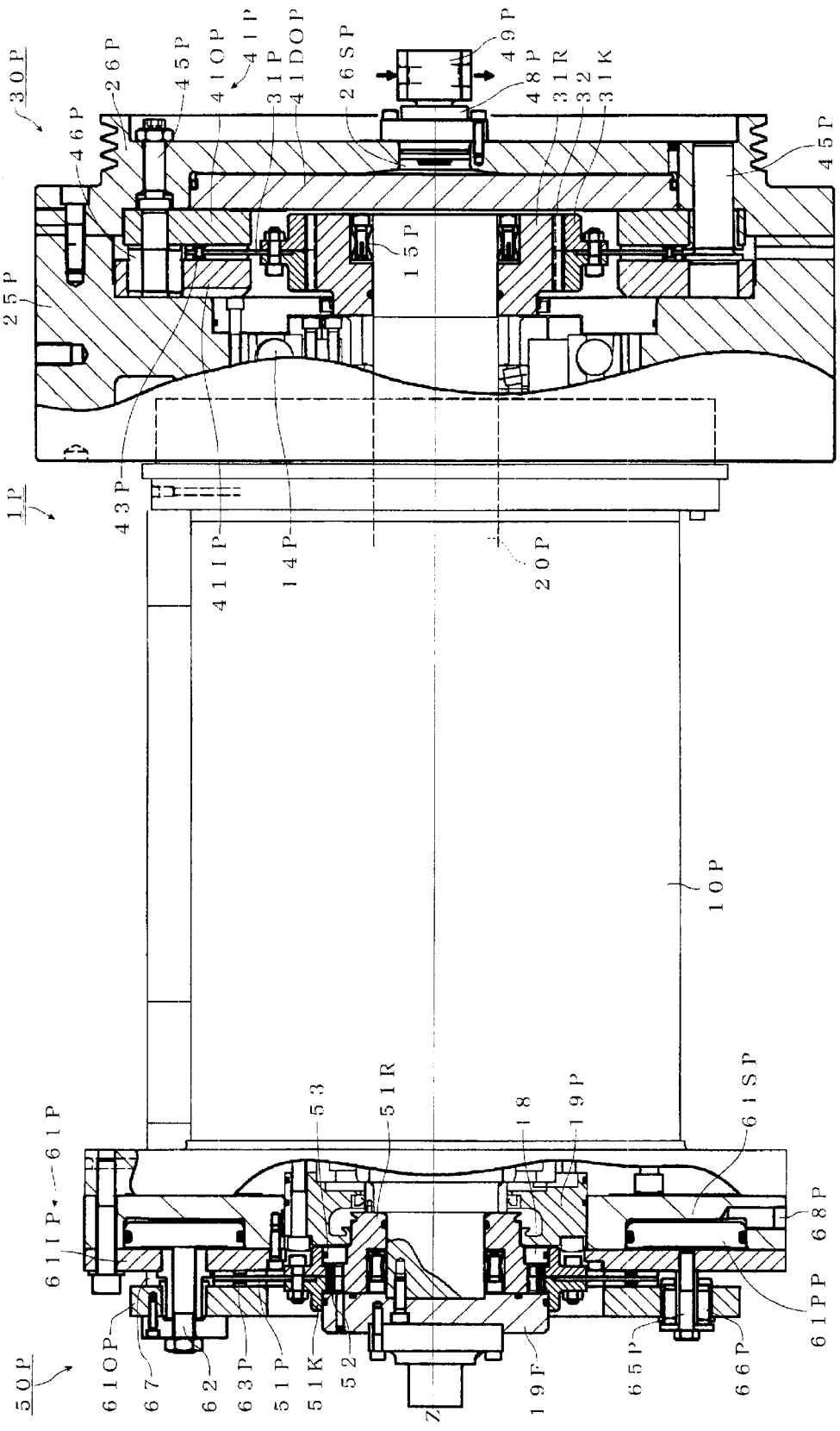
FIG. 2 is a cross-sectional view illustrating the prior art.

One embodiment of the present invention will now be described with reference to the drawings.

shown in FIG. 1, a clutch-brake system (30, 50) according to this embodiment includes a combination of a separate clutch device 30 with a separate brake device 50, the structures of these devices being basically similar to those of the clutch and brake devices according to the prior art as shown by 30P and 50P in FIG. 2. The clutch-brake system (30, 50) may be used to drive and stop a press machine 1. The clutch device 30 includes clutch disc elements 41 including first and second clutch discs 41I, 41O engageable and disengageable with a clutch friction plate 31 which is anchored on a drive shaft 20. The brake device 50 includes brake disc elements 61 including first and second brake discs 61I, 61O engageable and disengageable with a brake friction plate 51 which is similarly anchored on a drive shaft 20.

More particularly, the clutch friction plate 31 in the clutch device 30 is mounted on the drive shaft 20 at one (or rightward) end to be synchronously rotatable and not to be movable in the axial (Z) direction. The first and second clutch discs 41I, 41O are mounted on the drive shaft 20 and located on the opposite sides of the clutch friction plate 31 to be movable in the Z direction. As the first and second clutch discs 41I, 41O are synchronously moved toward each other or away from each other in the Z direction, the clutch device 30 is selectively switched to either of the clutch engagement (ON) state or the clutch release (OFF) state.

The term "synchronized" or "synchronously" used in this patent specification means various driving states such as simultaneous driving, driving due to the same signal and so on, in addition to the physically complete synchronization.

More particularly, in FIG. 1, a frame 10 rotatably supports the drive shaft 20 through opposite support members 11 and opposite bearings 12 not to be movable in the axial (Z) direction. A fly wheel 25 is mounted on one (or rightward) end 21R of the drive shaft 20 to be rotatable and not to be movable in the Z direction through the support and bearing 11, 14.

A clutch friction plate 31 which forms part of the clutch device 30 is mounted on the rightward end 21R of the drive shaft 20 through a plurality of screws to be synchronously rotatable and not to be movable in the Z direction.

Therefore, the clutch device 30 has no spline structure and the like 32 for moving the clutch friction plate 31P in the Z direction as in FIG. 2 or the prior art, oil lubricating structure and alignment control structure. Thus, the inertial mass of the clutch device 30 can be reduced to greatly improve the speed and response thereof. Moreover, the clutch device 30 can be simplified in structure and reduced in cost while the assembling and adjusting steps are also simplified. In addition, the mechanical backlash and play between components can be reduced to decrease the noise level. No backlash and play can permit the clutch device 30 to work smoothly for a prolonged time period.

The first clutch disc 41I is fitted over an annular guide recess 25G centrally on the right side of the flywheel 25 to be movable in the Z direction. On the other hand, the second clutch disc 41O is fitted over an annular guide recess 26G centrally on the left side of a cover portion 26 for the flywheel 25 to be movable in the Z direction.

The annular guide recess 25G forms a first cylinder chamber 25S in which the first clutch disc 41I functions as a first piston. Similarly, the annular guide recess 26G forms a second cylinder chamber 26S in which the second clutch disc 41O functions as a second piston.

The pistons (41I, 40O) are slidably guided by guide pins 45 in the Z direction and biased away from each other in the normal (or clutch release) under the action of springs 46 fitted around the guide pins 47.

For such a purpose that the spacing (or gap) between the first clutch disc 41I located in the clutch release state and the left side of the clutch friction plate 31 will be equal to the spacing (or gap) between the second clutch disc 41O and the right side of the clutch friction plate 31, the clutch device 30 is designed to reduce the stroke (or move distance) of each of the first and second clutch discs 41I, 41O by half in comparison with the prior art. Therefore, the operation speed of the clutch device 30 can be doubled by reducing the operation time of the clutch device 30 by half. This can greatly improve the clutch operation characteristics (speed and response).

Linings 43 may be provided on the clutch friction plate 31. In this embodiment, however, each of the first and second clutch discs 41I, 41O may be provided with a lining 43. This more reduces the inertial mass (or so-called GD2) in the drive shaft 20 (or in any driven-member if the flywheel 25 is used as a source of drive).

The clutch device 30 includes a rotary joint 49 through which the compressed air is supplied into the air intake port 48. The compressed air enters the second cylinder chamber 26S through a flow passage 26R and then flows into the first cylinder chamber 25S through a hollow portion (or communicating passage 45R) in each of the guide pins 45.

The compressed air supplied into the air intake port 48 synchronously urges the first and second clutch discs 41I, 41O toward each other against the outward bias of the spring 46 in the Z direction. Thus, the clutch device 30 is switched to its clutch operation (ON) state.

If the compressed air is exhausted through the air intake port 48, the first and second clutch discs 41I, 41O are synchronously moved away from each other under the bias of the spring 46 in the Z direction. Thus, the clutch device 30 is switched to its clutch release (OFF) state.

The brake device 50 includes a brake friction plate 51 which is mounted on the drive shaft 20 at the other end to be synchronously rotatable and not to be movable in the Z direction, and first and second brake discs 61I, 61O which are mounted on the drive shaft 20 to be movable in the Z direction and located on the opposite sides of the brake friction plate 51 in the Z direction. As the first and second brake discs 61I, 61O are synchronously moved toward each other or away from each other in the Z direction, the brake device 50 is selectively switched to its brake engagement (ON) state or to its brake release (OFF) state.

More particularly, as shown in FIG. 1, the brake friction plate 51, which forms part of the brake device 50, is mounted on the drive shaft 20 at the other (or leftward) end 21L through a plurality of screws to be synchronously rotatable and not to be movable in the Z direction.

Therefore, the spline structure for moving the brake friction plate 51P in the prior art (FIG. 2) in the Z direction, oil lubricating structure (53) and alignment control structure (19F, 19P) can completely be eliminated. Thus, the inertial mass can be reduced and the speed and response can be greatly improved.

In comparison with the clutch device 30, the brake device 50 may more greatly be simplified in structure and reduced in cost. This can facilitates the assembling and adjusting steps while at the same time reducing the mechanical backlash and play between components to lower the noise level. As a result, the brake device 50 may smoothly be used and operated for an elongated time period.

The first and second brake discs 61I, 61O are held against rotation by a position restricting member 69 which is fastened to the frame 10 through a bolt. The first and second brake discs 61I, 61O are mounted to be movable in the Z direction within a spacing (or distance) between the leftward position restricting surface 69K of the position restricting member 69 and the rightward position restricting surface 10K of the frame 10.

In the viewpoint of anti-friction, such a spacing (or distance) is so selected that the spacing (or gap) between the first brake disc 61I placed in the brake release sate and the right side of the brake friction plate 51 as well as the spacing (or gap) between the second brake disc 61O and the left side of the brake friction plate 51 will be equal to the same spacing (or gap) as in the prior art (FIG. 2).

Thus, the stroke (or move distance) in each of the first and second brake discs 61I, 61O can be reduced by half in comparison with the prior art. This shortens the operation time to double the operation speed, thereby greatly improving the brake operation characteristics (speed and response).

In such an arrangement, the first brake disc 61I functions as a cylinder while the second brake disc 61O functions as a piston located therein. An annular cylinder chamber 61S is formed between the first and second brake discs 61I, 61O.

The first and second brake discs 61I, 61O are biased toward each other in the normal (brake engagement) state by springs 66 mounted around guide pins 65. This causes the first and second brake discs 61I, 61O to engage the brake friction plate 51 on the opposite sides. It will be apparent from FIG. 1 that the brake device 50 is greatly simplified in structure in comparison with the prior art (FIG. 2).

Linings 63 may be provided on the brake friction plate 51. In this embodiment, however, each of the first and second brake discs 61I, 61O may be provided with a lining 63. This more reduces the inertial mass (or so-called GD2) in the drive shaft 20 (or in any driven member if the flywheel 25 is used as a source of drive).

As the press is started, the compressed air is immediately supplied into the cylinder chamber 61S through an air intake port 68. Thus, the first and second brake discs 61I, 61O are synchronously moved away from each other in the Z direction against the inward bias of springs 66. Therefore, the brake device 50 will be switched to its brake release (OFF) state.

When the press is terminated, the compressed air is exhausted through the air intake port 68. Thus, the first and second brake discs 61I, 61O are synchronously moved toward each other in the Z direction under the inward bias of the springs 66. Therefore, the brake device 50 will be switched to its brake engagement (ON) state.

According to this embodiment of the present invention, at this time, the clutch device 30 has been placed in its normal (press termination) state. That is, the first and second clutch discs 41I, 41O are separated away from each other and also from the clutch friction plate 31 in the Z direction under the outward bias of the springs 46. Therefore, the clutch device 30 is placed in its clutch release state. The clutch friction plate 31 is held stationary in place on the end 21R of the drive shaft 20.

To initiate the pressing process, the clutch device 30 is selectively switched to its clutch engagement state. More particularly, the compressed air is supplied into each of the cylinder chambers 26S and 25S through the air intake port 48. Thus, the first and second clutch discs 41I, 41O functioning as pistons are synchronously moved toward each other or the clutch friction plate 31 in the Z direction (that is, the second clutch disc 41O being moved from left to right while the second clutch disc 41O being moved from right to left) against the outward bias of the springs 46. As a result, the first and second clutch discs 41I, 41O will engage the clutch friction plate 31 on the opposite sides.

Thus, the clutch device 30 can selectively be switched from its clutch release state to its clutch engagement state. At this time, the move distance of each of the first and second clutch discs 41I, 41O is one-half smaller than those of the prior art to reduce the operation time by half.

On the other hand, the pressing process may be stopped by selectively switching the clutch device 30 to its clutch release state. More particularly, as the compressed air is exhausted from the respective cylinder chambers 26S and 25S through the air intake port 48, the first and second clutch discs 41I, 41O are synchronously moved away from each other or from the clutch friction plate 31 in the Z direction (that is, the first clutch disc 41I being moved from right to left while the second clutch disc 41O being moved from left to right) under the outward bias of the springs 46. As a result, the clutch discs 41I, 41O are disengaged from the clutch friction plate 31.

In such a manner, a safety side system will be configured which can selectively switch the clutch device 30 from its clutch engagement (ON) state to its clutch release (OFF) state on any air-fail. At this time, the move distance of each of the first and second clutch discs 41I, 41O is only required to be one-half those of the prior art. This can reduce the operation time by half.

Therefore, the clutch operation characteristics (response and speed) can greatly be improved. Since the clutch friction plate 31 is fixedly mounted on the drive shaft 20, the spline structure 32 and the like for moving the brake friction plate as in the prior art may be eliminated. This reduces the inertial mass and implements quick response.

In comparison with the prior art requiring the spline structure (32) for moving the brake friction plate 51 in the axial direction, the clutch device 30 according to this embodiment of the present invention can greatly be simplified in structure and reduced in cost. Moreover, the mechanical backlash and play between components can be reduced to lower the noise level and to increase the mechanical life. In addition, since the brake operation can more early be utilized, the clutch device of the present invention can appropriately be actuated in timing with the brake device (or brake release characteristic) on actuation of the clutch device, even though the brake device used in the present invention is the brake device 50 according to the prior art.

In the normal (press termination) position, the brake device 50 is placed in its brake engagement (ON) state. The first and second brake discs 61I, 61O are biased toward each other or toward the brake friction plate 51 in the Z direction under the inward bias of the springs 66 to engage the brake friction plate 51 on its opposite sides. The brake friction plate 51 is held stationary in place on the other end 21L of the drive shaft 20.

To initiate the pressing process, the brake device 50 is selectively switched to its brake release state. More particularly, the compressed air is supplied into the cylinder chamber 61S through the air intake port 68. Therefore, the first and second brake discs 61I, 61O functioning as pistons are synchronously moved away from each other or from the brake friction plate 51 in the Z direction (that is, the first brake disc 61I being moved from left to right while the second brake disc 61O being moved from right to left) against the outward bias of the springs 66.

Thus, the brake device 50 can selectively be switched from its brake engagement state to its brake release state. At this time, the move distance of each of the first and second brake discs 61I, 61O is only required to be one-half those of the prior art. This can reduce the operation time by half.

To stop the pressing process, the brake device 50 is selectively switched to its brake engagement state. More particularly, the compressed air is exhausted from the cylinder chamber 61S through the air intake port 68. Thus, the first and second brake discs 61I, 61O are synchronously moved toward each other or toward the brake friction plate 51 in the Z direction (that is, the first brake disc 61I being moved from right to left while the second brake disc 61O being moved from left to right). Thus, the first and second brake discs 61I, 61O will engage the brake friction plate 51 on the opposite sides thereof.

In such a manner, a safety side system will be configured which can selectively switch the brake device 50 from its brake release (OFF) state to its brake engagement (ON) state on any air-fail. At this time, the move distance of each of the first and second brake discs 61I, 61O is only required to be one-half those of the prior art. This can reduce the operation time by half.

Therefore, the brake operation characteristics (response and speed) can greatly be improved. Since the brake friction plate 51 is fixedly mounted on the drive shaft 20, the spline structure 52 as in the prior art may be eliminated. This reduces the inertial mass and implements the quick response.

In comparison with the prior art requiring the spline structure (52) for moving the brake friction plate 51 in the axial direction, oil lubricating structure (53) and alignment control structure (19F, 19P), the brake device 50 according to this embodiment of the present invention can greatly be simplified in structure and reduced in cost. Moreover, the mechanical backlash and play between components can be reduced to lower the noise level and to increase the mechanical life. In addition, since the brake operation can more early be utilized, the brake device of the present invention can appropriately be actuated in timing with the clutch device (or clutch release characteristic) on actuation of the brake device, even though the clutch device used in the present invention is the clutch device 30P according to the prior art.

According to this embodiment, both the separate type clutch and brake devices 30, 50 can have their responsibilities and high-speed performances improved over those of the prior art (30P and 50P). Therefore, the inertial mass on the drive shaft 20 can more be reduced to more greatly improve the clutch and brake operation characteristics (response and speed). At the same time, any spline structures for axially moving the respective friction plates 31 and 51 and other structures required in the prior can completely be eliminated so that the clutch-brake system can more greatly be simplified in structure and reduced in cost. Moreover, the mechanical life can greatly be increased with the noise level being lowered. In addition, the combination of the clutch engagement with the brake release or the combination of the brake engagement with the clutch release can surely be carried out at high speed.

Since each of these combinations can synchronously be carried out through the supply or exhaust of the compressed air, the press machine can rapidly be started or stopped. Thus, the rapid start-up of the press and the stop of the press within a range in which the slide will not move beyond the bottom dead center can surely and stably be carried out. The selection of the brake and clutch operations can more easily be performed. The press machine can safely be run due to the air fail safety system.

As described, this embodiment of the invention provides a high-response and high-speed type clutch-brake system which can engage and release the clutch device 30 and release and engage the brake device 50 by fixedly mounting the friction plates (31 and 51) on the drive shaft 20 at the opposite ends thereof and by moving two discs (41I, 41O or 61I, 61O) toward or away from the respective friction plates (31 or 51) through one-half stroke smaller than that of the prior art (FIG. 2). However, one of the clutch and brake devices may be of high-response and high-speed structure while the other may be of prior art structure as shown in FIG. 2. However, it is to be understood that such an arrangement cannot provide such an advantage as in this embodiment.

The clutch device according to this embodiment provides the following superior advantages:

(1) Since the stroke in the clutch discs can be reduced by half in comparison with the prior art, it can be doubled in speed to more greatly improve the clutch operation characteristics (response and speed).

(2) Since the clutch friction plate is fixedly mounted on the drive shaft, the spline structure and the like which would be required in the prior art can be eliminated to reduce the inertial mass and to improve the quick response.

(3) Since the clutch friction plate is fixedly mounted on the drive shaft, the clutch device may more greatly be simplified in structure and reduced in cost, in comparison with the prior art which required the spline structure for axially moving the clutch friction plate, oil lubricating structure and alignment control structure. This also facilitates the assembling step.

(4) The mechanical backlash and play between components can be reduced to lower the noise level. Moreover, the effective life of the clutch device can be increased while running the clutch device smoothly.

(5) Since the clutch operation is more early used, the clutch device can appropriately be run in timing with the brake device (brake release characteristic).

The brake device according to this embodiment provides the following superior advantages:

(1) Since the stroke in the brake discs can be reduced by half in comparison with the prior art, it can be doubled in speed to more greatly improve the brake operation characteristics (response and speed).

(2) Since the brake friction plate is fixedly mounted on the drive shaft, the spline structure and the like which would be required in the prior art can be eliminated to reduce the inertial mass and to improve the quick response.

(3) Since the brake friction plate is fixedly mounted on the drive shaft, the brake device may more greatly be simplified in structure and reduced in cost, in comparison with the prior art which required the spline structure for axially moving the clutch friction plate, oil lubricating structure and alignment control structure. This also facilitates the assembling step.

(4) The mechanical backlash and play between components can be reduced to lower the noise level. Moreover, the effective life of the brake device can be increased while running the brake device smoothly.

(5) Since the brake operation is more early used, the brake device can appropriately be run in timing with the clutch device (clutch release characteristic).

When the clutch and brake devices are combined together, the clutch-brake system can provide the clutch and brake operation characteristics (response and speed) more greatly improved by more reducing the inertial mass on the drive shaft. Furthermore, the clutch-brake system can more greatly be simplified in structure and reduced in cost by completely eliminating the spline structures for axially moving the respective friction plates with the mechanical life thereof being highly increased and with the noise level thereof being more lowered. In addition, the combination of the clutch engagement with the brake release or the combination of the brake engagement with the clutch release can surely be carried out at high speed.

What is claimed is:

1. A clutch-brake system comprising:
   a flywheel;
   a drive shaft driven by rotational energy transmitted from the flywheel;
   a clutch device selectively switchable between an operation state in which the rotational energy from the flywheel is transmitted to the drive shaft, and a non-operation state in which no rotational energy is transmitted to the drive shaft; and
   a brake device selectively switchable between an operation state in which a braking force is applied to the drive shaft during rotation, and a non-operation state in which the braking force is released to permit rotation of the drive shaft,
   wherein the clutch device has;
   a clutch friction plate mounted on the drive shaft to be synchronously rotatable on the drive shaft, but not to be movable in the axis direction of the drive shaft;
   first and second clutch discs provided on the opposite sides of the clutch friction plate in the axis direction of the drive shaft, and movable in the axis direction;
   a first cylinder chamber which houses the first clutch disc; and
   a second cylinder chamber which houses the second clutch disc.

2. The clutch-brake system as defined in claim 1, wherein the clutch friction plate is fixed to an end surface of the drive shaft.

3. The clutch-brake system as defined in claim 1, further comprising:
   guide pins which guide the first and second clutch discs; and
   springs which are provided around the guide pins to bias the first and second clutch discs away from each other.

4. The clutch-brake system as defined in claim 3, wherein each of the guide pins is formed to have a hollow shaft having a hollow that functions as an air supply and exhaust passage for one of the first and second cylinder chambers.

5. The clutch-brake system as defined in claim 1, wherein each of the first and second clutch discs has a lining on a surface facing the clutch friction plate.

6. A press machine comprising the clutch-brake system as defined in claim 1.

7. A clutch-brake system comprising,
   a flywheel;
   a drive shaft driven by rotational energy transmitted from the flywheel;
   a clutch device selectively switchable between an operation state in which the rotational energy from the flywheel is transmitted to the drive shaft, and a non-operation state in which no rotational energy is transmitted to the drive shaft; and
   a brake device selectively switchable between an operation state in which a braking force is applied to the drive shaft during rotation, and a non-operation state in which the braking force is released to permit rotation of the drive shaft,
   wherein the brake device includes;
   a brake friction plate mounted on the drive shaft to be synchronously rotatable on the drive shaft, but not to be movable in the axis direction of the drive shaft; and
   first and second brake discs provided on the opposite sides of the brake friction plate in the axis direction of the drive shaft, and movable in the axis direction,
   wherein the first brake disc has a cylinder structure and the second brake disc has a piston structure.

8. The clutch-brake system as defined in claim 7, wherein the brake friction plate is fixed to an end surface of the drive shaft.

9. The clutch-brake system as defined in claim 7, further comprising:
   guide pins which guide the first and second brake discs; and
   springs which are provided around the guide pins to bias the first and second brake discs away from each other.

10. The clutch-brake system as defined in claim 7, wherein each of the first and second brake discs has a lining on a surface facing the brake friction plate.

11. A press machine comprising the clutch-brake system as defined in claim 7.

* * * * *